United States Patent [19]

Serini et al.

[11] Patent Number: 4,491,656

[45] Date of Patent: Jan. 1, 1985

[54] POLYPHOSPHATES AND PROCESS OF PREPARATION

[75] Inventors: Volker Serini; Bernhard Schulte, both of Krefeld; Hans-Dieter Block, Cologne; Dieter Freitag, Krefeld, all of Fed. Rep. of Germany

[73] Assignee: Bayer Aktiengesellschaft, Leverkusen, Fed. Rep. of Germany

[21] Appl. No.: 527,833

[22] Filed: Aug. 30, 1983

[30] Foreign Application Priority Data

Sep. 10, 1982 [DE] Fed. Rep. of Germany ........ 3233616

[51] Int. Cl.³ .............................................. C08G 79/04
[52] U.S. Cl. .................................. 528/167; 528/169; 528/398
[58] Field of Search .................... 528/167, 169, 398

[56] References Cited

U.S. PATENT DOCUMENTS

| | | | |
|---|---|---|---|
| 4,123,420 | 10/1978 | Kyo et al. | 528/167 |
| 4,134,876 | 1/1979 | Horner et al. | |
| 4,322,520 | 3/1982 | Schmidt et al. | 528/167 |
| 4,331,614 | 5/1982 | Schmidt et al. | 528/167 |
| 4,374,971 | 2/1983 | Schmidt et al. | 528/167 |
| 4,415,719 | 11/1983 | Schmidt et al. | |

FOREIGN PATENT DOCUMENTS

| | | |
|---|---|---|
| 0021260 | 1/1981 | European Pat. Off. |
| 1800625 | 5/1969 | Fed. Rep. of Germany |
| 2421977 | 2/1975 | Fed. Rep. of Germany |
| 2701493 | 7/1977 | Fed. Rep. of Germany |

OTHER PUBLICATIONS

Patent Abstracts of Japan Band 2, Nr. 85, Jul. 12, 1978, p. 1270C78 and JP-A-53-45355.

*Primary Examiner*—Lester L. Lee
*Attorney, Agent, or Firm*—Connolly and Hutz

[57] ABSTRACT

This invention relates to a process for the production of branched polyphosphates.

2 Claims, No Drawings

POLYPHOSPHATES AND PROCESS OF PREPARATION

This invention relates to a process for the production of branched polyphosphates.

Processes for the production of polyphosphates are known. Thus, DE-OS No. 2,701,493 describes a process for the production of polyphosphates which have polycondensation degrees $\overline{P}$ of from 2 to 25.

This process comprises two steps. In the first step, phosphorus oxychloride is reacted with bisphenol, and in the second step, the reaction product of the first step is reacted with phenol in the presence of anhydrous alkali metal halides, for example LiCl, at a temperature of up to about 300° C. During this reaction, HCl is eliminated with the formation of oligomeric products and is removed from the reaction product. Furthermore, excess phosphorus oxychloride and excess phenol are distilled off. The end products still contain residual chlorine from the phosphorus oxychloride and also the inorganic chlorides used as catalysts.

A process for the production of branched polyphosphates which have relative viscosities $\eta$rel of from 1.010 to 1.200 (in $CH_2Cl_2$, c=5 g/l) has now been found and is characterised in that from 1 to 100 mol % of one or more aromatic diols corresponding to formula (1):

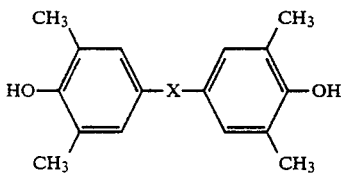

wherein
X represents a $C_1$–$C_5$ alkylene or alkylidene radical, a $C_5$–$C_6$ cycloalkylene or cycloalkylidene radical, a single bond, —S— or a radical corresponding to the formula (1a):

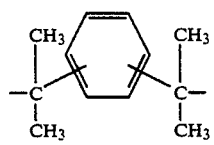

wherein the two alkyl substituents may be in the o, m or p position relative to each other, and from 99 to 0 mol % of hydroquinone, resorcine or an aromatic diol corresponding to formula (2)

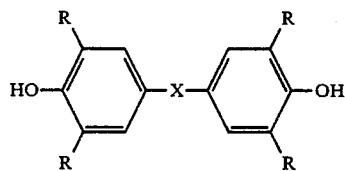

wherein
R represents hydrogen, halogen as chlorine and bromine and $C_1$–$C_3$ alkyl with the provision that at most three alkyl groups are present,
X has the meaning as given in formula (1)

are reacted with at least one phosphoric acid ester corresponding to formula (3):

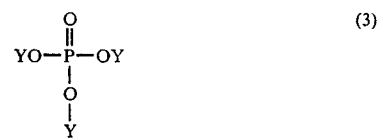

wherein
Y represents the same or different alkyl-, cycloalkyl-, aryl- and alkylaryl-radicals in the presence of basic alkali metal or alkaline earth metal compounds with the release of alcohols and/or phenols at a temperature of from 80° to 350° C.

The following aromatic diols corresponding to formula (1) may be used, for example, for the production of the polyphosphates according to the present invention:
bis-(3,5-dimethylphenyl-4-hydroxyphenyl)-methane,
1,1-bis-(3,5-dimethylphenyl-4-hydroxyphenyl)-ethane,
2,2-bis-(3,5-dimethylphenyl-4-hydroxyphenyl)-propane,
2,2-bis-(3,5-dimethylphenyl-4-hydroxyphenyl)-butane,
2,4-bis-(3,5-dimethylphenyl-4-hydroxyphenyl)-2-methylbutane,
3,3-bis-(3,5-dimethylphenyl-4-hydroxyphenyl)-pentane,
1,1-bis-(3,5-dimethylphenyl-4-hydroxyphenyl)-cyclopentane,
1,1-bis-(3,5-dimethylphenyl-4-hydroxyphenyl)-cyclohexane,
bis-(3,5-dimethylphenyl-4-hydroxyphenyl),
bis-(3,5-dimethylphenyl-4-hydroxyphenyl)-sulphide, and
$\alpha,\alpha'$-bis-(3,5-dimethylphenyl-4-hydroxyphenyl)-p-diisopropylbenzene.

The following are preferred as aromatic diols corresponding to formula (1):
bis-(3,5-dimethyl-4-hydroxyphenyl)-methane, and
2,2-bis-(3,5-dimethyl-4-hydroxyphenyl)-propane.

2,2-bis-(3,5-dimethyl-4-hydroxyphenyl)-propane is particularly preferred as an aromatic diol corresponding to formula (1).

The following are included as examples of aromatic diols corresponding to formula (2): hydroquinone, resorcinol, dihydroxyphenyls, bis-(hydroxyphenyl)-alkanes, bis-(hydroxyphenyl)-cycloalkanes, bis-(hydroxyphenyl)-sulphides, $\alpha,\alpha'$-bis-(4-hydroxyphenyl)-diisopropylbenzenes, and the nuclear-alkylated compounds thereof, provided they do not fall within formula (1). These and other suitable aromatic diols corresponding to formula (2) are described, for example in U.S. Pat. Nos. 3,028,365; 2,999,835; 3,148,172; 3,271,368; 2,991,273; 3,271,367; 3,780,087; 3,014,891; 2,999,846; in DE-OS Nos. 2,063,050; 2,211,957; 1,570,803; 2,329,585, 2,329,686 and in the monograph "Hermann Schnell, Chemistry and Physics of Polycarbonates, Polymer Reviews, Volume 9, Interscience Publishers, New York, 1964".

Of the aromatic diols corresponding to formula (2), those corresponding to formula (4);

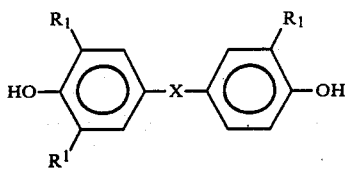
(4)

wherein
X is defined in formula (1), and
$R^1$ represents H or $CH_3$,
are preferred.

Examples of such preferred aromatic diols corresponding to formula (4) are as follows:
2,2-bis-(4-hydroxyphenyl)-propane,
2,2-bis-(4-hydroxyphenyl)-butane,
2,4-bis-(4-hydroxyphenyl)-2-methylbutane,
1,1-bis-(4-hydroxyphenyl)-cyclohexane,
bis-(4-hydroxyphenyl),
bis-(4-hydroxyphenyl)-sulphide,
α,α'-bis-(4-hydroxyphenyl)-p-diisopropylbenzene,
2-(3-methyl-4-hydroxyphenyl)-2-(4-hydroxyphenyl)-propane,
2,2-bis-(3-methyl-4-hydroxyphenyl)-propane,
2-(3,5-dimethyl-4-hydroxyphenyl)-2-(4-hydroxyphenyl)-propane, and
2-(3-methyl-4-hydroxyphenyl)-2-(3,5-dimethyl-4-hydroxyphenyl)-propane.

Aromatic diols corresponding to formula (4) are particularly preferred, wherein $R^1$ at least partly represents $CH_3$, but particularly if the two methyl groups are in the ortho-position to one phenolic OH group. Examples include the last four of the above-mentioned diols corresponding to formula (4):
2-(3-methyl-4-hydroxyphenyl)-2-(4-hydroxyphenyl)-propane,
2,2-bis-(3-methyl-4-hydroxyphenyl)-propane,
2-(3,5-dimethyl-4-hydroxyphenyl)-2-(4-hydroxyphenyl)-propane, and
2-(3-methyl-4-hydroxyphenyl)-2-(3,5-dimethyl-4-hydroxyphenyl)-propane.

The bis-phenoles of the formulas (1) and (2) may be used as pure compounds. But it is also possible to use bis-phenoles which are the products of the processes described in DE-OS No. 2,928,464 and DE-OS No. 2,928,443. In this cases the crude reaction products of these processes, which may contain by-products up to an amount of 15% may be used without any further purification.

In the phosphoric acid esters corresponding to formula (3), the radicals Y represent organic radicals which may be the same or different. The radicals Y may represent alkyl, including cycloalkyl, aryl and alkylaryl radicals which may be substituted (for example by halogen).

Examples of alkyl groups include the following: $C_1$–$C_{12}$ alkyl groups, such as methyl, ethyl, propyl, butyl, pentyl, hexyl, heptyl, octyl, nonyl, decyl, undecyl, dodecyl and isomers thereof, such as neopentyl, 3,5,5-trimethylhexyl, 3-methylhexyl, 2-ethylhexyl, 2,5,5-trimethylhexyl, also cyclohexyl, 2-chloroethyl and 2,3-dibromopropyl.

Examples of aryl and alkylaryl radicals include $C_6$ aryl radicals and substituted phenyls, such as phenyl, o, m-, p-methylphenyl, 2,6-dimethylphenyl, 2,4-dimethylphenyl, 2,4,6-trimethylphenyl, diphenyl, 2- and 4-isopropylphenyl, nonylphenyl, 4-tert.-butylphenyl, 2,4,6-trichlorophenyl, 4-chlorophenyl, 4-bromophenyl, 2,4,6-tribromophenyl, naphthyl and benzyl. Of the radicals Y mentioned, the aryl radicals are preferred, particularly the halogen-free radicals. Of these, the phenyl, the o, m, p-methylphenyl and the 2,6-dimethylphenyl radicals in turn are more particularly preferred.

Phosphoric acid esters corresponding to formula (3) include the following, for example:
bis-(phenyl)-methylphosphate,
bis-(ethyl)-phenylphosphate,
bis-(ethyl)-2,6-dimethylphenylphosphate,
bis-(phenyl)-ethylphosphate,
tris-(2-chloroethyl)-phosphate,
bis-(phenyl)-2-chloroethylphosphate,
bis-(butyl)-phenylphosphate,
bis-(phenyl)-butylphosphate,
bis-(neopentyl)-phenylphosphate,
bis-(4-methylphenyl)-2-ethylhexylphosphate,
bis-(2-ethylhexyl)-phenylphosphate,
bis-(2-ethylhexyl)-4-methylphenylphosphate,
bis-(phenyl)-2-ethylhexylphosphate,
tris-(octyl)-phosphate,
bis-(phenyl)-octylphosphate,
bis-(octyl)-phenylphosphate,
bis-(3,5,5-trimethylhexyl)-phenylphosphate,
bis-(2,5,5-trimethylhexyl)-4-methylphenylphosphate,
bis-(phenyl)-isodecylphosphate,
bis-(dodecyl)-4-methylphenylphosphate,
bis-(dodecyl)-phenylphosphate,
tris-(phenyl)-phosphate,
tris-(2-methylphenyl)-phosphate,
tris-(4-methylphenyl)-phosphate,
bis-(2-methylphenyl)-phosphate,
bis-(4-methylphenyl)-phosphate,
bis-(phenyl)-2-methylphenylphosphate,
bis-(phenyl)-4-methylphenylphosphate,
tris-(isopropylphenyl)-phosphate,
bis-(isopropylphenyl)-phenylphosphate,
bis-(phenyl)-isopropylphenylphosphate,
tris-(nonylphenyl)-phosphate,
tris-(2,6-dimethylphenyl)-phosphate,
bis-(2,6-dimethylphenyl)-phenylphosphate,
bis-(phenyl)-2,6-dimethylphenylphosphate,
bis-(2,6-dimethylphenyl)-4-tert.-butylphenylphosphate,
bis-(2,6-dimethylphenyl)-4-methylphenylphosphate,
bis-(2,6-dimethylphenyl)-3-methylphenylphosphate,
bis-(2,6-dimethylphenyl)-4-isopropylphenylphosphate, and
bis-(2,6-dimethylphenyl)-2-isopropylphenylphosphate.

Triaryl esters are preferred phosphoric acid esters corresponding to formula (3). Phosphoric acid esters corresponding to formula (3) which are particularly preferred are triaryl esters having three identical aryl esters or having at least two 2,6-dimethylphenyl radicals, for example:
tris-(phenyl)-phosphate,
tris-(2-methylphenyl)-phosphate,
tris-(4-methylphenyl)-phosphate,
tris-(isopropylphenyl)-phosphate,
tris-(2,6-dimethylphenyl)-phosphate,
bis-(2,6-dimethylphenyl)-phenylphosphate,
bis-(2,6-dimethylphenyl)-2-methylphenylphosphate,
bis-(2,6-dimethylphenyl)-4-methylphenylphosphate, and
bis-(2,6-dimethylphenyl)-isopropylphenylphosphate.

Triaryl esters which are more particularly preferred are triphenylphosphate and tri-(2,6-dimethylphenyl)-phosphate.

Basically acting alkali metal and alkaline earth metal compounds may be used according to the present invention as catalysts. They may be of an organic or inorganic nature. Such compounds include the following, for example: metals, for example Li, Na, Ca; hydrides, for example LiH, NaH, KH, $CaH_2$; oxides, for example $Li_2O$, $Na_2O$, CaO, BaO; hydroxides, for example LiOH, NaOH, KOH, $Ba(OH)_2$, $Sr(OH)_2$, $Ca(OH)_2$; alkali metal borohydrides, for example $NaBH_4$; amides of alkali metals, for example Li-, Na- and K-amide; alkali- and alkaline earth metal alcoholates, for example methylates, ethylates, propylates, butylates, cyclohexanolates of Li, Na, K or Ca; phenolates, for example the Li-, Na- and K-salts of phenol, of o-, m-, p-cresol, of 2,6-dimethylphenyl; bis-alkali metal salts of aromatic dihydroxy compounds, such as the Li-, Na- and K-salts of 2,2-bis-(4-hydroxyphenyl)propane, or of 2,2-bis-(3,5-dimethyl-4-hydroxyphenyl)-propane.

The alkali metal compounds are preferred, and of these, the Na and K compounds are preferred. The hydroxides, alcoholhates, phenolates and bisphenolates are particularly preferred. Na-phenolate is more particularly preferred.

The reaction of the aromatic diols with the phosphoric acid esters is generally carried out as follows. The phosphoric acid ester is introduced and melted if it is not already liquid, but is a solid. The aromatic diol is added to the phosphoric acid ester and is dissolved with heating. The catalyst is then added. The elimination of alcohol or phenyl then commences at an elevated temperature. The eliminated alcohol or phenol is distilled off. The polyphosphate according to the present invention remains as a melt.

The process is carried out analogously if several aromatic diols or several phosphoric acid esters are used. The addition sequence of the starting components may differ from that described above. Solubility of the components in each other is not strictly necessary for the reaction, even if it is favourable. The time of addition of the catalyst after the starting components have been melted is not critical. The catalyst may also be added before or during the melting operation of the starting components. It may also be useful subsequently to add catalyst during the reaction to maintain an adequate reaction rate. The catalyst does not need to be dissolved, or does not need to be completely dissolved in the reaction mixture, although this may be favourable for the reaction and for the quality of the product which is obtained.

The starting components are generally melted at a temperature of from 50° to 300° C., preferably at from 100° to 250° C. and more preferably from 125° to 225° C.

The catalyst is preferably added after the starting components have been melted. It is particularly favourable for the start and the continuation of the reaction if the catalyst is added at from 100° to 250° C., preferably at from 125° to 225° C.

The reaction temperature is maintained as low as possible, and it is generally from 100° to 350° C., preferably from 125° to 300° C. and more preferably from 150° to 250° C.

The reaction temperature in the initial phase, in which most of the alcohol or phenol (=90%) is eliminated is as low as possible, preferably from 100° to 250° C., and more preferably from 125° to 225° C.

Polycondensation advantageously takes place under reduced pressure, because as a result of this, the eliminated alcohol or phenol is quickly removed from the reaction mixture.

The process is generally carried out under pressures of from 600 to 0.01 mm Hg, preferably under pressures of from 400 to 0.025 mm Hg, and more preferably under pressures of from 250 to 0.05 mm Hg. Most of the alcohol or phenol (about 90%) is generally eliminated at from 600 to 10 mm Hg. The remaining alcohol or phenol is generally distilled off at from 10 to 0.01 mm Hg.

A pressure balance which may possibly become necessary may be achieved using inert gas (for example $CO_2$ or $N_2$). In this manner, atmospheric oxygen is kept away as far as possible from the reaction medium. The reactants are also generally melted under inert gas.

The residual content of eliminated alcohol in the polyphosphate according to the present invention is generally less than 2%, preferably less than 1% by weight, more preferably less than 0.5% and most preferably less than 0.1%, based on the quantity of polyphosphate which is obtained according to the present invention.

The minimum quantity of catalyst to be used depends on the type of aromatic diols which are used. The quantity of catalyst may vary within the range of a power of ten, depending on the aromatic diol which is used. This may be advisable in view of the sensitivity of some aromatic diols, the intensity of the reaction and the possible sensitivity of the polyphosphates.

During the reaction of aromatic diols corresponding to the formulae (1), (2) and (4) with phosphates corresponding to formula (3), from 1.0 to 0.0001, preferably from 0.5 to 0.0005, and more preferably from 0.05 to 0.0005 mols of alkali metal or alkaline earth metal/mol of phosphate are generally used.

When large quantities of catalyst are used, it may be advantageous to begin the reaction at a low temperature and under only a slightly reduced pressure.

The branched polyphosphates which are produced contain ionic groups, the number of which depends on the quantity of alkali metal or alkaline earth metal which is used as catalyst and which will be described in the following.

The branched polyphosphates which are produced according to the present process are new polymers which have commercially advantageous properties. Of the polyphosphates, those are preferred which, in addition to containing residues of the aromatic diols corresponding to formula (2) and in particular to formula (4), also contain at least 25 mol %, preferably at least 50 mol %, and more preferably at least 85 mol % of residues of aromatic diols corresponding to formula (1).

Branched polyphosphates are most particularly preferred which only contain, condensed therein, aromatic diols corresponding to formula (1).

During the production of the branched polyphosphates according to the present invention, the aromatic diols and the monomeric phosphates are generally used in a molar ratio of from 0.66:1 to 2.3:1. Ratios of from 0.66:1 to 0.96:1 and from 2.3:1 to 1.6:1 are preferred, while ratios of from 0.75:1 to 0.96:1 and from 2.2:1 to 1.6;1 are particularly preferred, and ratios of from 0.8:1 to 0.92;1 and from 2.1:1 to 1.7:1 are most particularly preferred.

The branched polyphosphates according to the present invention consist of polymer units corresponding to formulae (5) and/or (6) and optionally (7), and they contain branching points corresponding to formula (8):

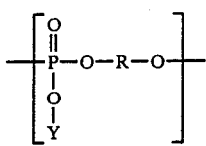
(5)

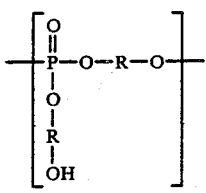
(6)

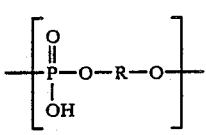
(7)

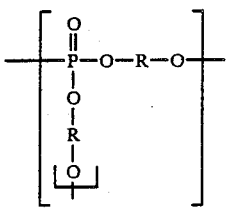
(8)

and terminal groups corresponding to the formulae (9), (10), (11) and optionally corresponding to the formulae (12), (13) and (14):

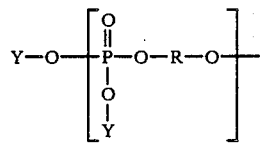
(9)

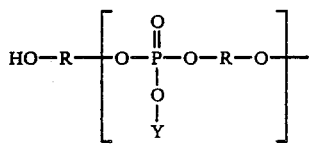
(10)

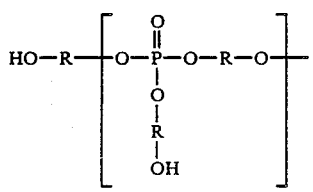
(11)

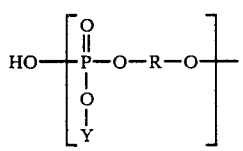
(12)

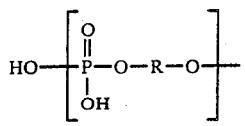
(13)

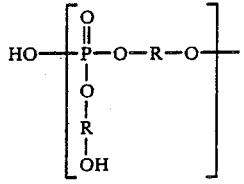
(14)

in which
Y has the meaning as given in formula (3) and
R denotes a radical of the formula

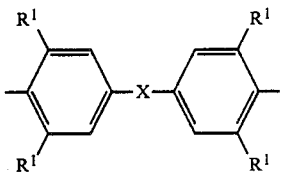

in which
R¹ denotes hydrogen, $C_1$–$C_3$ alkyl, halogen such as chlorine or bromine and
X has the meaning as given in formula (1).

The polymer units of formula (7) and the terminal groups of formulae (12), (13) and (14) may be present, if, for example, alkali metal hydroxides are used as catalysts or if moisture is not excluded or if a little water is added.

The branched polyphosphates of this invention contain ionic groups, which may be formed by a reaction of terminal OH-groups with basic compounds, e.g. by the reaction with the alkali compounds used as catalysts. They form salts, e.g. $-O^{\ominus}Me^{\oplus}$ or $-O^{\ominus}Me^{\oplus\oplus}{}^{\ominus}O-$. $Me^{\oplus}$ represents, for example alkali metal ions, such as $Li^{\oplus}$, $Na^{\oplus}$ or $K^{\oplus}$, and $Me^{\oplus\oplus}$ represents, for example, alkaline earth metal ions, such as $Ca^{\oplus\oplus}$ or $Ba^{\oplus\oplus}$.

The number of these ionic groups depends on the quantity of catalyst which is used. Branched polyphosphates are generally preferred which contain ionic groups corresponding to the quantity of catalyst which is preferably used. However, in particular cases, it may be desirable to bring the content of ionic groups to a particularly high or a particularly low level. In the first case, particularly large quantities of catalyst are used during polycondensation, and in the second case, particularly low quantities of catalyst are used. In particular cases, the content of ionic groups may be reduced by adding base-binding substances. Such base-binding substances include, for example, dialkyl sulphates, such as dimethyl sulphate or diethyl sulphate, or organic acids, such as toluene sulphonic acid.

These compounds are generally introduced into the polymer melt in the required quantity towards the end of the polycondensation reaction. Thereafter, the reaction conditions are still maintained for some time so that the base-binding substances which have been added may react with the ionic phosphate groups.

The content of certain groups corresponding to formulae (5) to (14) in the polyphosphate according to the present invention may be influenced by the adjustment of specific molar ratios of aromatic diol corresponding to formulae (1) and/or (2) and of phosphate corresponding to formula (3).

This may be of major importance for the respective purpose of use. Thus, for example, in the case of molar ratios of aromatic diol:phosphate equal to 0.66:1–1.49:1, the structural units corresponding to formulae (5) and (9) generally predominate with respect to the structural units corresponding to formulae (6) and (11), whereas in the case of molar ratios of aromatic diol/phosphate equal to 1.51–2.3:1, the structural units corresponding to formulae (6) and (11) predominate with respect to the structural units corresponding to formulae (5) and (9). In the case of the preferred molar ratios of aromatic diol/phosphate equal to 0.5:1–0.96:1, structural units corresponding practically only to formulae (5) and (9) of the structural units corresponding to formulae (5), (6), (9), (10) and (11) may be contained in the polyphosphate of the present invention, and in the case of the preferred molar ratios of aromatic diol:phosphate of from 2.5:1 to 2.03:1, structural units corresponding practically only to formulae (6) and (11) may be contained in the polyphosphate of the present invention.

In the first case, this means that there are practically no aromatic diol phenolic OH groups in the polyphosphate (for example $\leq 0.2\%$, preferably $\leq 0.1\%$ of aromatic diol OH. In the second case, this means that there is practically the maximum quantity possible of aromatic diol phenolic groups in the polyphosphate. One or the other may be advantageous, depending on the purpose of use. The degree of polycondensation may be followed by continuously measuring the melt viscosity of the reaction medium.

The branched polyphosphates of this invention may be viscous resins at 20° C. or may be more or less plastic resins. They then have glass transition temperatures of below 20° C. However, they may also be rigid thermoplastic resins, which preferably have glass transition temperatures $T_g$ of above 20° C. Such resins having glass transition temperatures $T_g$ of above 40° C. are particularly preferred and those which have glass transition temperatures of above 60° C., in particular above 70° C., are more particularly preferred.

The process according to the present invention has several advantages over the process of the initially mentioned DE-OS No. 2,701,493. First of all, the starting materials are easier to handle, because inert phosphoric acid esters may be used instead of the aggressive phosphorus oxychloride. In addition thereto, our process is a one-step process, whereas the process of DE-OS No. 2,701,493 is to be carried out in two steps, which requires a particular commercial expense. While our process is advantageously to be carried out in conventional steel boilers, the process of DE-OS No. 2,701,493 requires expensive glass or enamel apparatus owing to the risk of corrosion caused by starting materials and resulting corrosive gases. Moreover, the process of DE-OS No. 2,701,493 has the disadvantage compared to our process that a considerably decomposition of the bisphenol into disadvantageous, to some extent strongly coloured, by-products may generally commence at the high reaction temperature owing to evolving HCl gas, which by-products are disadvantageous to the reaction and also to the end products.

The branched polyphosphates according to the present invention have advantages over polyphosphates known hitherto, for example such polyphosphates of DE-OS No. 2,701,493. They do not contain any HCl or hydrochloric acid which cannot be avoided in the case of polyphosphates which are obtained by elimination of HCl from the starting components. Consequently, they do not result in corrosion, even during thermoplastic processing on processing machines, for example extruders, rollers or kneaders, or in moulds. Furthermore, any corrosion during contact of the ionic, branched polyphosphates with other metal parts, for example when used in the electronics sector, is avoided. The polyphosphates of this invention do not contain any chlorine radicals bound to phosphorus, or any metal halides. Such bound Cl radicals and metal halides also result in corrosive damage during processing or use.

The branched polyphosphates according to the present invention may advantageously be mixed with many other polymers.

The branched polyphosphates of this invention have apparent molecular weights $\overline{M}_w$ (measured by gel chromatography, with BPA polycarbonate as control) of from 1600 to 150,000, preferably from 2300 to 50,000, more preferably from 3200 to 25,000 and most preferably from 5000 to 20,000.

The relative viscosity of these polyphosphates generally ranges from 1.01 to 1.20, preferably from 1.02 to 1.18, and more preferably from 1.03 to 1.15 (measured in $CH_2Cl_2$, c=0.5 g/l).

The branched polyphosphates of this invention have average polycondensation degrees $\overline{P}$ of from 3 to 30, based on the phosphate group in the polyphosphate. Polycondensation degrees $\overline{P}$ of from 4 to 25 are preferred, and degrees of from 7 to 20 are particularly preferred.

The branched polyphosphates according to the present invention which contain, condensed therein, only small amounts of aromatic diols corresponding to formula (1) may range from viscous to plastic and more or less elastic at 20° C., in particular with a low polycondensation degree, i.e., they have glass transition temperatures of below 20° C. The glass transition temperatures rises very rapidly when the polycondensation degrees rises and in particular when there are higher quantities of aromatic diols corresponding to formula (1) condensed therein. Thus, when there are average condensation degrees of about $\overline{P}=4$, glass transition temperatures $T_g$ which are clearly above 20° C. may be obtained, whereas when $\overline{P}=7$, the glass transition temperatures $T_g$ generally lie above 60° C. and may rise up to above $T_g=150°$ C. within a range up to a maximum of $\overline{P}=30$.

The branched polyphosphates of this invention are suitable as mixture components with other polymers. In particular, the polyphosphates which have higher glass transition temperatures only slightly reduce the heat stability of the mixtures.

The branched polyphosphates of this invention exhibit a high flowability during thermoplastic processing, in spite of their relatively high glass transition temperature and in spite of the ionic groups. The flowability of the mixtures with other polymers is also extremely high.

The polyphosphates of the present invention also exhibit a surprisingly high stability to hydrolysis. Furthermore, when mixed with other polymers, they have a stabilizing effect with respect to discolouration and polymer decomposition which may occur owing to, for example, the effects of heat and oxygen and owing to hydrolysis.

Another property of the branched polyphosphates of this invention is the fact that they are flame-resistant and that they hardly burn when introduced into a flame. They are also suitable as flame-retarding mixture components with more readily combustible polymers. Such polymer mixtures may optionally contain, in addition to the branched polyphosphates of the present invention, other flame-retarding compounds, for example halogen compounds and metal oxides.

In contrast to polyphosphates known hitherto, the branched polyphosphates of the present invention carry ionic groups, as described above. Owing to these ionic groups, they exhibit, in addition to the other properties which have already been described, the following properties: for example, an improved metal adhesion, a reduced electrostatic charging ability and an improved printing ability, even in admixture with other polymers.

The polyphosphates of this invention may be used for various purposes, for example as stabilizers, plasticizers, lubricants, flameproofing additives and as other auxiliaries for duroplasts and thermoplasts. They may also be used on their own as adhesives and as cements and for coatings or mouldings, for which they are suitable owing to their effective adhesion to various materials, such as glass, metal and wood, and owing to their high flame resistance, their low melt viscosity and their high hydrolysis stability.

Thermoplasts which may advantageously be modified by the branched polyphosphates of this invention are, for example, homo- and copolymers of styrene and derivatives thereof, of acrylic and methacrylic compounds, of maleic acid anhydride and of vinyl chloride, and rubber-modified variants thereof. Such homo- and copolymers include the following, for example: polystyrene, styrene-acrylonitrile copolymer, α-methyl styrene-acrylonitrile copolymer, styrene maleic acid anhydride copolymer, polymethylmethacrylate, styrene-methylmethacrylate copolymer, styrene-acrylonitrile-methylmethacrylate copolymer and polyvinyl chloride. Rubber-modified variants of such polymers include, for example, ABS polymers and HIPS polymers. Other thermoplasts which may advantageously be modified using the branched, ionic polyphosphates of the present invention include the following, for example: polyamides, cellulose esters, aromatic-aliphatic polyesters, such as polyethylene- and polybutylene terephthalate, aromatic polyesters, aromatic polycarbonates, polysulphones, polyethersulphones and in particular polyphenylene ether and mixtures thereof with homo- or copolymers of styrene, such as mixtures of poly-(2,6-dimethyl p-phenylene oxide) and rubber-modified polystyrene, such as HIPS (=High impact polystyrene).

Duroplasts may also be advantageously modified by the branched polyphosphates of the present invention. They may be admixed before hardening with the duromers, for example phenol resins, polyurethane systems, melamine resins, epoxy resins, unsaturated polyester resins and other cross-linking polymers.

EXAMPLES

Example 1

Production of a branched polyphosphate from 2,2-bis-(3,5-dimethyl-4-hydroxyphenyl)-propane and triphenylphosphate 326.1 g (1 mol) of triphenylphosphate were melted in a stirrer-equipped flask, and heated to 200° C. 256.0 g (0.9 mols) of 2,2-bis-(3,5-dimethyl-4-hydroxyphenyl)-propane were then added and dissolved. 116.1 g (0.02 mols) of Na-phenolate were added and also dissolved. The pressure was then slowly reduced to 200 mm Hg at 200° C. and the phenol which was released was distilled off. When the release of phenol subsided, the pressure was then slowly further lowered to 0.2 mm Hg and more phenol was drawn off. After this pressure reduction, the mixture was maintained for a further 30 minutes at 220° C. and under 0.2 mm Hg, and the remaining phenol was drawn off. During the melting procedure and during condensation, the mixture was maintained under $N_2$ and was stirred. A product remained as residue which solidified while cooling into a rigid, solid polymer. The properties of this polymer are given in Table 1.

Examples 2 to 6

Production of other branched polyphosphates from different aromatic diols

Other branched, ionic polyphosphates were produced (Examples 2 to 5) according to the directions of Example 1, but different starting materials were used (as stated in Table 1). Properties of the branched, ionic polyphosphates which were obtained are given in Table 1.

TABLE 1

Production of branched polyphosphates (Examples 1–6)

| Ex. | Aromatic diols used (molar ratio) | Molar ratio of arom. diols: TPP | Catalyst Na—phenolate (mol/mol TPP) | Polyphosphate Consistency | Colour | rel | $T_g$(°C.) |
|---|---|---|---|---|---|---|---|
| 1 | TMBPA | 0.90:1 | 0.02 | Rigid | light yellow | 1.08 | 85 |
| 2 | TMBPA | 1.05:1 | 0.015 | Rigid | light yellow | 1.09 | 102 |
| 3 | TMBPA | 1.75:1 | 0.02 | Rigid | colourless | 1.06 | 110 |
| 4 | TMBPA | 0.90:1 | 0.01 | Rigid | colourless | 1.10 | 71 |
| 5 | TMBPA/BPA 60/40 | 0.80:1 | 0.008 | Rigid | light-yellow | 1.04 | 48 |
| 6 | TMPBA/DMBPA 60/40 | 0.80:1 | 0.015 | Rigid | light-yellow | 1.04 | 58 |

Table 1

TMBPA = 2,2-bis-(3,5-dimethyl-4-hydroxyphenyl)-propane.
TMBPF = bis-(3,5-dimethyl-4-hydroxyphenyl)-methane.

BPA=2,2-bis(4-hydroxyphenyl)-propane.
DMBPA=2-(3,5-dimethyl-4-hydroxyphenyl)-2-(4-hydroxyphenyl)-propane.
TPP=triphenylphosphate.
$T_g$=Glass transition temperature, measured by differential thermoanalysis.
$\eta$rel=relative viscosity, measured in $CH_2Cl_2$ at 25° C.,
c=5 g/l.

We claim:

1. A process for the production of branched polyphosphates having relative viscosities of rel=1.010 to 1.200 (in $CH_2Cl_2$, c=5 g/l), characterised in that from 1 to 100 ml % of one or more aromatic diols corresponding to formula (1):

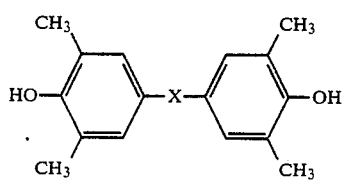

wherein
X represents a $C_1$-$C_5$ alkylene or alkylidene radical, a $C_5$-$C_6$ cycloalkylene or cycloalkylidene radical, a single bond, —S— or a radical corresponding to formula (1a):

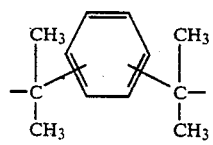

wherein the two alkylene substituents may be in the o, m or p position relative to each other,
and from 99 to 0 mol % of hydroquinone, resorcine or an aromatic diol corresponding to formula (2):

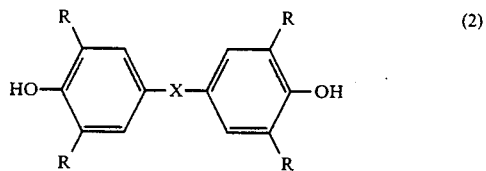

wherein
R represents hydrogen, halogen as chlorine and bromine and $C_1$-$C_3$ alkyl with the provision that at most three alkyl groups are present,
X has the meaning as given in formula (1)
are reacted with at least one phosphoric acid ester corresponding to formula (3):

wherein
Y represents the same or different alkyl-, cyclo- alkyl-, aryl- and alkylaryl-radicals and wherein the ratio of aromatic diol to phosphonic acid ester is from about 0.66:1 to 2.3:1 in the presence of basic alkali metal or alkaline earth metal compounds with the release of alcohols and/or phenols at a temperature of from 80° to 350° C.

2. Branched polyphosphates characterized in that they are produced according to the process of claim 1.

* * * * *